United States Patent
Campbell

(10) Patent No.: US 12,391,358 B2
(45) Date of Patent: Aug. 19, 2025

(54) PRESSURE DIFFERENTIAL LOCKOUT SYSTEM AND CALIBRATION METHOD

(71) Applicant: The Boeing Company, Arlington, VA (US)

(72) Inventor: Leanne M. Campbell, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 288 days.

(21) Appl. No.: 18/314,721

(22) Filed: May 9, 2023

(65) Prior Publication Data

US 2024/0376751 A1 Nov. 14, 2024

(51) Int. Cl.
*B64C 1/14* (2006.01)
*E05B 77/54* (2014.01)
*E05B 81/10* (2014.01)

(52) U.S. Cl.
CPC .......... *B64C 1/1423* (2013.01); *B64C 1/1415* (2013.01); *B64C 1/143* (2013.01); *B64C 1/1461* (2013.01); *E05B 77/54* (2013.01); *E05B 81/10* (2013.01)

(58) Field of Classification Search
CPC ..... B64C 1/1423; B64C 1/1415; B64C 1/143; B64C 1/1461; E05B 77/54; E05B 81/10
See application file for complete search history.

(56) References Cited

U.S. PATENT DOCUMENTS

| 2012/0032028 | A1* | 2/2012 | Pritzen | B64C 1/1407 244/129.5 |
| 2017/0058570 | A1* | 3/2017 | Leonard | E05B 17/14 |
| 2022/0135201 | A1* | 5/2022 | Mortland | B64C 1/1423 244/129.5 |
| 2024/0208634 | A1* | 6/2024 | Campbell | B64D 13/02 |

* cited by examiner

*Primary Examiner* — Rodney A Bonnette
(74) *Attorney, Agent, or Firm* — Alleman Hall & Tuttle LLP

(57) ABSTRACT

A pressure differential lockout system for a door separating first and second regions comprises a piston assembly, a follower linkage, and a fluid conduit. The follower linkage is mechanically coupled with a latch release handle of the door. The piston assembly includes a piston and a piston housing collectively defining an interior chamber. The fluid conduit provides fluid communication between the first region and the interior chamber. The piston is translatable along a translation axis relative to the piston housing responsive to a pressure differential between the interior chamber and the second region. The piston defines a channel that is parallel to the translation axis and that accommodates a follower component of the follower linkage. The channel inhibits rotation of the follower linkage within a first translation range of the piston and enables rotation of the follower linkage within a second translation range of the piston.

20 Claims, 7 Drawing Sheets

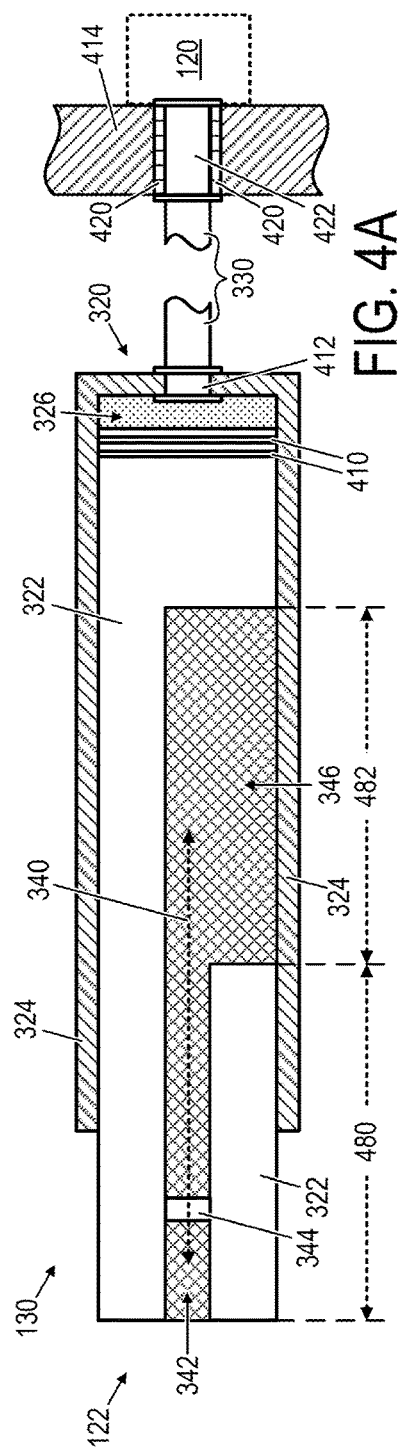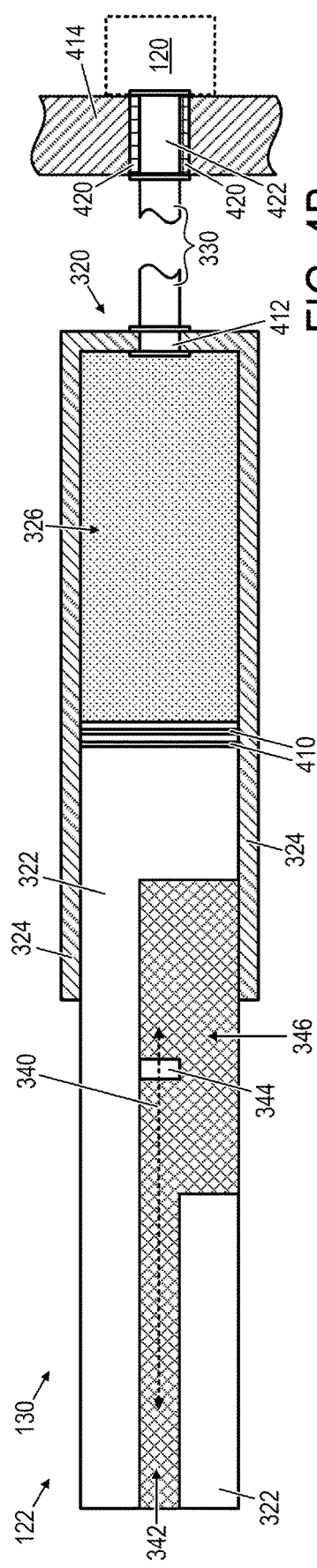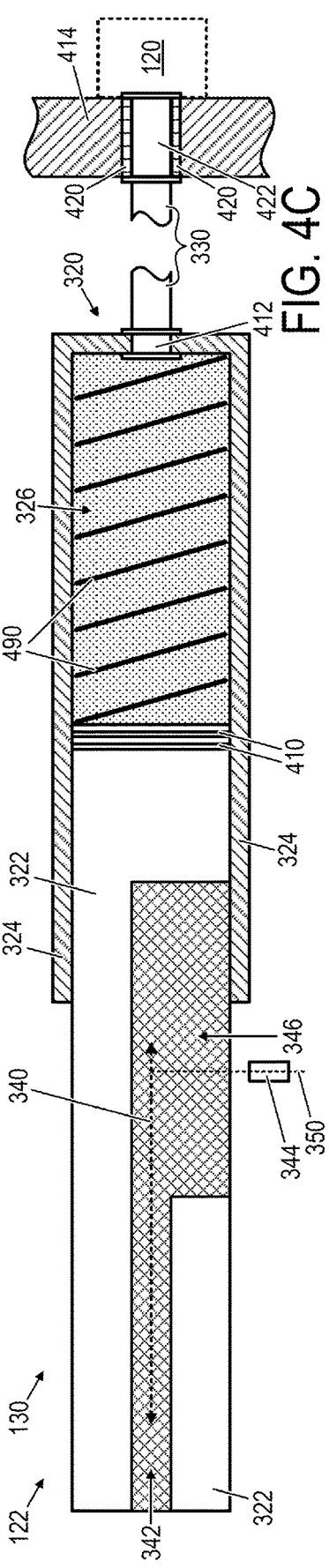

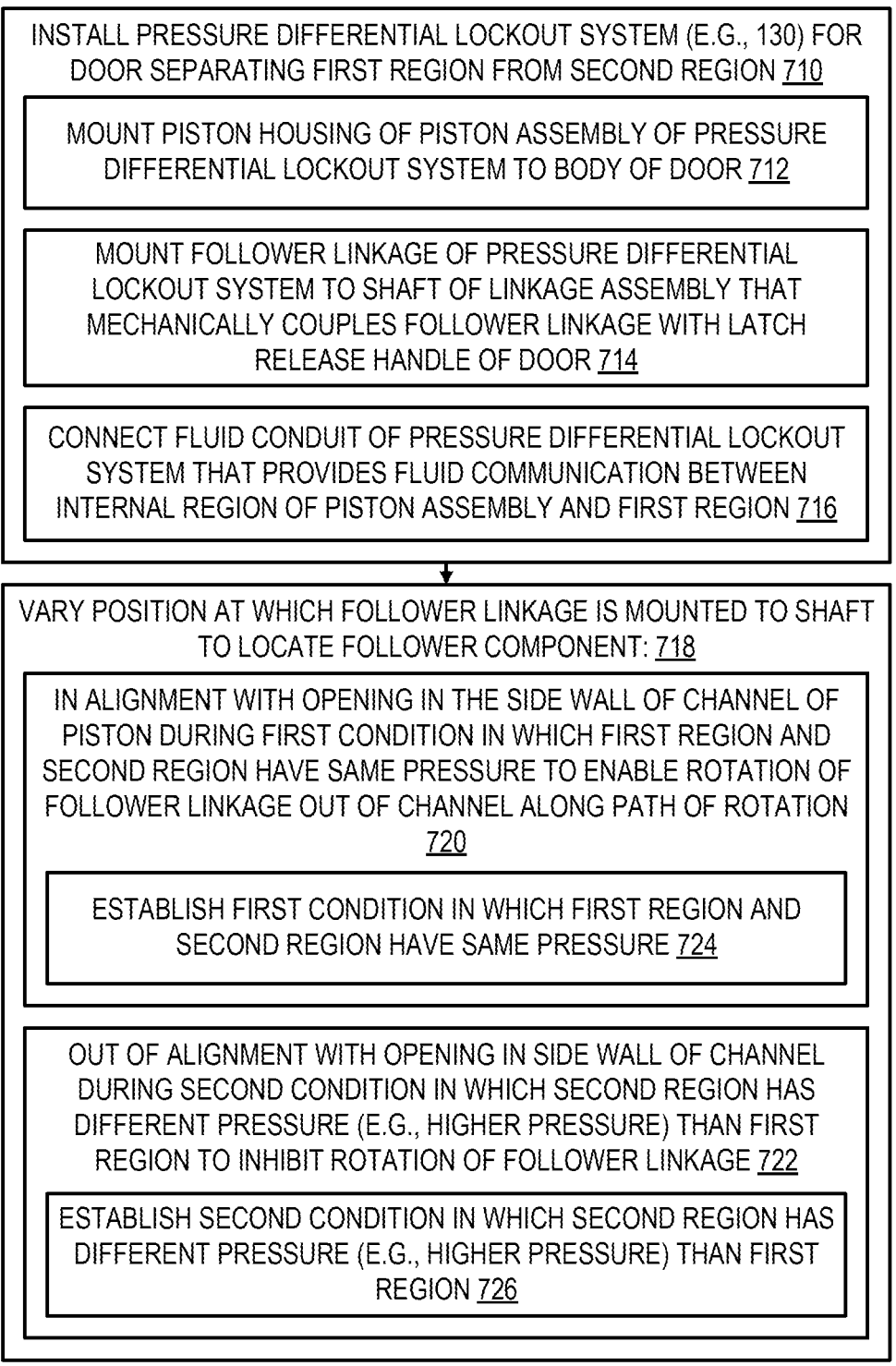

```
┌─────────────────────────────────────────────────────────────────┐
│  INSTALL PRESSURE DIFFERENTIAL LOCKOUT SYSTEM (E.G., 130) FOR   │
│      DOOR SEPARATING FIRST REGION FROM SECOND REGION 710        │
│  ┌───────────────────────────────────────────────────────────┐  │
│  │  MOUNT PISTON HOUSING OF PISTON ASSEMBLY OF PRESSURE      │  │
│  │  DIFFERENTIAL LOCKOUT SYSTEM TO BODY OF DOOR 712          │  │
│  └───────────────────────────────────────────────────────────┘  │
│  ┌───────────────────────────────────────────────────────────┐  │
│  │    MOUNT FOLLOWER LINKAGE OF PRESSURE DIFFERENTIAL        │  │
│  │  LOCKOUT SYSTEM TO SHAFT OF LINKAGE ASSEMBLY THAT         │  │
│  │  MECHANICALLY COUPLES FOLLOWER LINKAGE WITH LATCH         │  │
│  │          RELEASE HANDLE OF DOOR 714                       │  │
│  └───────────────────────────────────────────────────────────┘  │
│  ┌───────────────────────────────────────────────────────────┐  │
│  │  CONNECT FLUID CONDUIT OF PRESSURE DIFFERENTIAL LOCKOUT   │  │
│  │  SYSTEM THAT PROVIDES FLUID COMMUNICATION BETWEEN         │  │
│  │  INTERNAL REGION OF PISTON ASSEMBLY AND FIRST REGION 716  │  │
│  └───────────────────────────────────────────────────────────┘  │
└─────────────────────────────────────────────────────────────────┘
                                 ↓
┌─────────────────────────────────────────────────────────────────┐
│  VARY POSITION AT WHICH FOLLOWER LINKAGE IS MOUNTED TO SHAFT    │
│            TO LOCATE FOLLOWER COMPONENT: 718                    │
│  ┌───────────────────────────────────────────────────────────┐  │
│  │  IN ALIGNMENT WITH OPENING IN THE SIDE WALL OF CHANNEL OF │  │
│  │  PISTON DURING FIRST CONDITION IN WHICH FIRST REGION AND  │  │
│  │  SECOND REGION HAVE SAME PRESSURE TO ENABLE ROTATION OF   │  │
│  │  FOLLOWER LINKAGE OUT OF CHANNEL ALONG PATH OF ROTATION   │  │
│  │                          720                              │  │
│  │  ┌─────────────────────────────────────────────────────┐  │  │
│  │  │  ESTABLISH FIRST CONDITION IN WHICH FIRST REGION AND│  │  │
│  │  │     SECOND REGION HAVE SAME PRESSURE 724            │  │  │
│  │  └─────────────────────────────────────────────────────┘  │  │
│  └───────────────────────────────────────────────────────────┘  │
│  ┌───────────────────────────────────────────────────────────┐  │
│  │  OUT OF ALIGNMENT WITH OPENING IN SIDE WALL OF CHANNEL    │  │
│  │  DURING SECOND CONDITION IN WHICH SECOND REGION HAS       │  │
│  │  DIFFERENT PRESSURE (E.G., HIGHER PRESSURE) THAN FIRST    │  │
│  │  REGION TO INHIBIT ROTATION OF FOLLOWER LINKAGE 722       │  │
│  │  ┌─────────────────────────────────────────────────────┐  │  │
│  │  │  ESTABLISH SECOND CONDITION IN WHICH SECOND REGION  │  │  │
│  │  │  HAS DIFFERENT PRESSURE (E.G., HIGHER PRESSURE)     │  │  │
│  │  │  THAN FIRST REGION 726                              │  │  │
│  │  └─────────────────────────────────────────────────────┘  │  │
│  └───────────────────────────────────────────────────────────┘  │
└─────────────────────────────────────────────────────────────────┘
```

FIG. 7

PRESSURE DIFFERENTIAL LOCKOUT SYSTEM AND CALIBRATION METHOD

FIELD

The subject disclosure relates generally to a pressure differential lockout system and calibration method for a door separating a first region from a second region, such as an exterior door of an aircraft, as an example.

BACKGROUND

Pressure differential environments can be used to maintain a suitable pressure within an enclosed space, such as an aircraft cabin, as an example. Doors separating two regions can be maintained in a closed state during certain operations to maintain a pressure differential between the two regions. These doors can be opened to enable access between the two regions when the pressure differential is eliminated or reduced to below a suitable level. Technical challenges exist for inhibiting doors separating two regions from being opened when a substantial pressure differential exists between the two regions.

SUMMARY

A pressure differential lockout system for a door separating a first region from a second region is disclosed. As an example, the door can take the form of an exterior door of an aircraft that separates a cabin of the aircraft from an exterior operating environment. The system comprises a follower linkage mechanically coupled with a latch release handle of a linkage assembly of the door. The system further comprises a piston assembly including a piston and a piston housing collectively defining an interior chamber of the piston assembly. The system further comprises a fluid conduit that provides fluid communication between the first region and the interior chamber of the piston assembly. The piston is translatable along a translation axis relative to the piston housing responsive to a pressure differential between the interior chamber of the piston assembly and the second region in fluid communication with an exterior side of the piston from the interior chamber. The piston defines a channel that is parallel to the translation axis and that accommodates a follower component of the follower linkage. The channel defined by the piston inhibits rotation of the follower linkage within a first translation range of the piston along the translation axis and enables rotation of the follower linkage within a second translation range of the piston along the translation axis.

BRIEF DESCRIPTION OF THE DRAWINGS

FIGS. 4A, 4B, and 4C depict additional aspects of the pressure differential lockout system of FIGS. 3A and 3B.

FIG. 7 is a flow diagram depicting an example method of calibrating a pressure differential lockout system for a door separating a first region from a second region.

DETAILED DESCRIPTION

Figure 1:
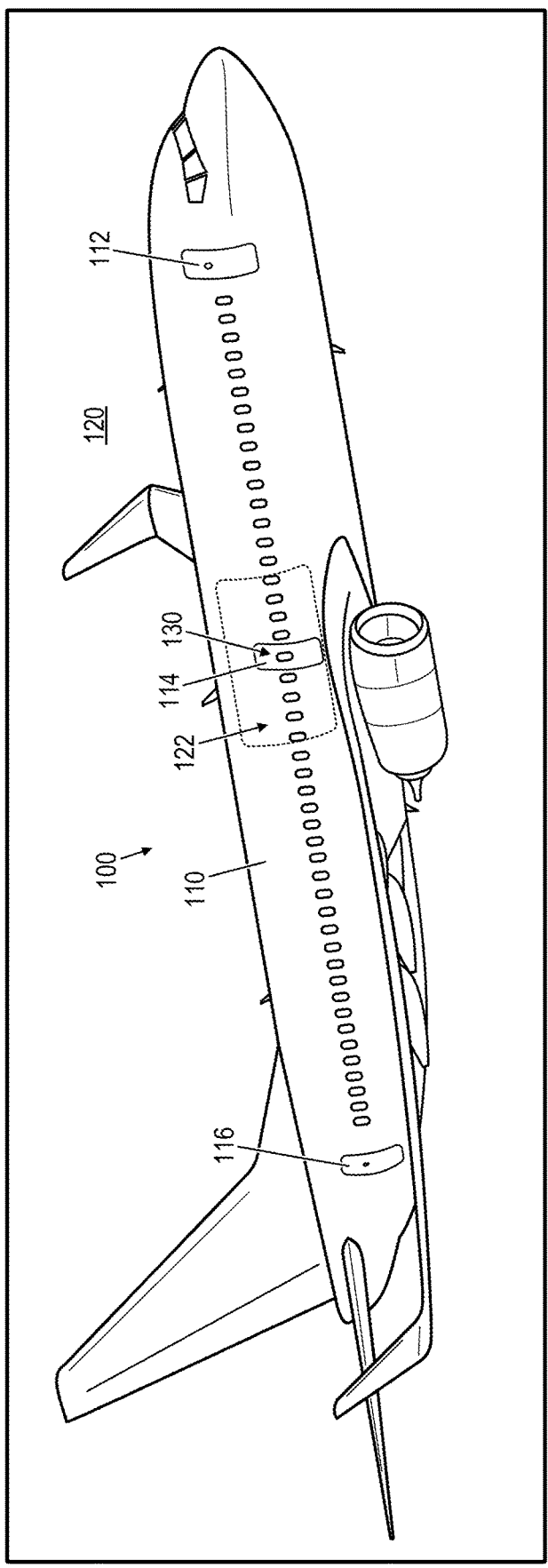
FIG. 1 depicts an example aircraft.

As briefly introduced above, technical challenges exist for inhibiting doors separating two regions from being opened when a substantial pressure differential exists between the two regions. Two regions separated by a door can each comprise a fluid, such as air, water, or other fluid types, including other gases and liquids. For example, in the context of a door of an aircraft, the door can separate a first region comprising air (e.g., an operating environment within which the aircraft operates) from a second region comprising air (e.g., an interior cabin of the aircraft). As another example, the door can separate a first region comprising air from a second region comprising water. As yet another example, the door can separate a first region comprising water from a second region comprising water. In each of the preceding examples, a pressure differential may be present between the first region and the second region during which the door is to remain closed, at least until the pressure differential between the two regions is equalized or reduced to below a threshold level.

A pressure differential lockout system for a door separating two regions is disclosed that offers the potential to inhibit the door from being opened when a pressure differential between the two regions exceeds a threshold. The pressure differential lockout system disclosed herein can be used in connection with mobile vehicles or stationary structures (e.g., stationary pressure vessels, building structures, etc.). As an example, the pressure differential lockout system can be used in connection with an exterior door of an aircraft that separates a cabin of the aircraft from an exterior operating environment. While examples are disclosed herein within the context of an aircraft, it will be understood that the disclosed pressure differential lockout system can be used in other contexts in which a door separates two regions of different pressure.

According to an example, the pressure differential lockout system comprises a follower linkage mechanically coupled with a latch release handle of a linkage assembly of the door. The system further comprises a piston assembly including a piston and a piston housing collectively defining an interior chamber of the piston assembly. The system further comprises a fluid conduit that provides fluid communication between the first region and the interior chamber of the piston assembly. As previously described, the first region can comprise a fluid such as air, water, or other gas or liquid. Fluid communication provided by the fluid conduit enables fluid exchange and pressure equalization of a fluid such as air, water, etc. between the first region and the interior chamber of the piston assembly.

The piston is translatable along a translation axis relative to the piston housing responsive to a pressure differential between the interior chamber of the piston assembly and the second region in fluid communication with an exterior side of the piston from the interior chamber. The piston defines a channel that is parallel to the translation axis and that accommodates a follower component of the follower linkage. The channel defined by the piston inhibits rotation of the follower linkage within a first translation range of the piston along the translation axis and enables rotation of the follower linkage within a second translation range of the piston along the translation axis.

By inhibiting rotation of the follower linkage, as well as the latch release handle mechanically coupled with the follower linkage, the pressure differential lockout system inhibits opening of the door. A threshold pressure differential, above which rotation of the follower linkage is inhibited, can be calibrated using the features and techniques disclosed in further detail herein.

FIG. 1 depicts an example aircraft 100 that includes a fuselage 110 and one or more doors, such as doors 112, 114, 116 located at example locations along a first side of the fuselage. In this example, aircraft 100 takes the form of a commercial passenger airliner that includes a forward door (e.g., 112), an over-wing door (e.g., 114), and an aft door (e.g., 116) located on each side of fuselage 110. While aircraft 100 is described with reference to a commercial passenger airliner, it will be understood that aircraft 100 can take other forms, including other types of fixed wing aircraft, rotary wing aircraft, passenger aircraft, cargo aircraft, etc.

Fuselage 110 in combination with the various doors of aircraft 100 (e.g., 112, 114, and 116) separate a first region 120 that forms an operating environment of the aircraft from a second region 122 that forms an interior environment of the aircraft. Second region 122 is represented schematically by dotted lines in FIG. 1 in a vicinity of door 114. It will be understood that second region 122 can further include the remaining portions of the interior cabin of the aircraft.

Each door of aircraft 100 separating first region 120 from second region 122 can incorporate or otherwise be associated with a pressure differential lockout system. A general location of an example pressure differential lockout system 130 for door 114 is represented schematically in FIG. 1, aspects of which are described in further detail with reference to FIG. 2. As an example, system 130 can be integrated with door 114, such as being located within or mounted to a body of the door.

Each pressure differential lockout system (e.g., 130) can inhibit opening of a respective door (e.g., 114) of aircraft 100 while a pressure differential between first region 120 and second region 122 exceeds a threshold level. As an example, pressure differential lockout system 130 can inhibit door 114 from being opened by passengers located within second region 122 while a pressure of second region 122 exceeds a pressure of first region 120 by a threshold level.

Figure 2:
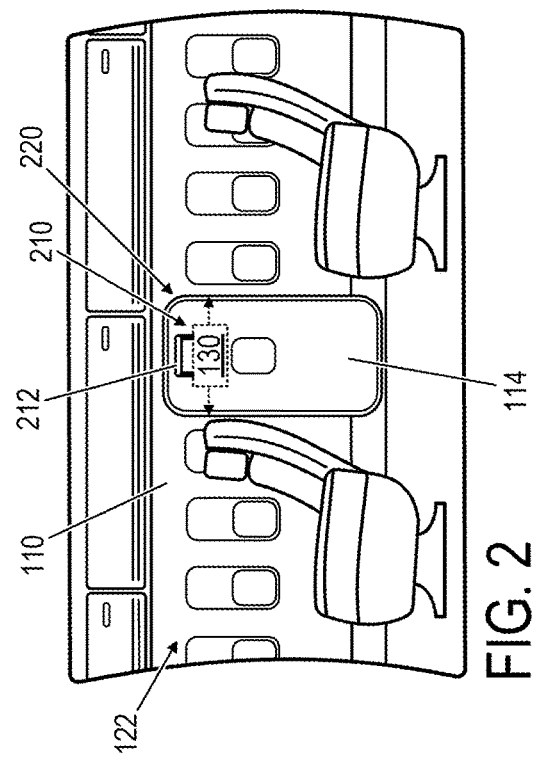
FIG. 2 depicts an example interior of the aircraft of FIG. 1.

FIG. 2 depicts an example interior of aircraft 100 of FIG. 1, corresponding to second region 122 in the vicinity of door 114. In this example, second region 122 includes a cabin of aircraft 100, and door 114 takes the form of an over-wing door accessible to passengers located within the cabin. It will be understood that door 114 can instead refer to a forward door (e.g., 112 of FIG. 1), an aft door (e.g., 116 of FIG. 1), or other suitable door location of an aircraft.

Door 114 is depicted in a closed state in FIG. 2. Door 114 includes a linkage assembly 210, represented schematically in FIG. 2. Linkage assembly 210 secures door 114 in the closed state with respect to a door frame 220 of fuselage 110 via one or more door latches of the linkage assembly. Linkage assembly 210 is operable via a latch release handle 212 to release door 114 from being secured by the door latches in the closed state to enable the door to be opened. As an example, latch release handle 212 can be rotated or otherwise manipulated by hand to disengage the door latches that secure door 114 in the closed state.

FIG. 2 schematically depicts pressure differential lockout system 130 integrated with door 114, aspects of which are described in further detail herein. System 130 inhibits linkage assembly 210 from being operable via latch release handle 212 to release door 114 from being secured in the closed state when the pressure differential between first region 120 and second region 122 exceeds a threshold level.

Figure 3A:
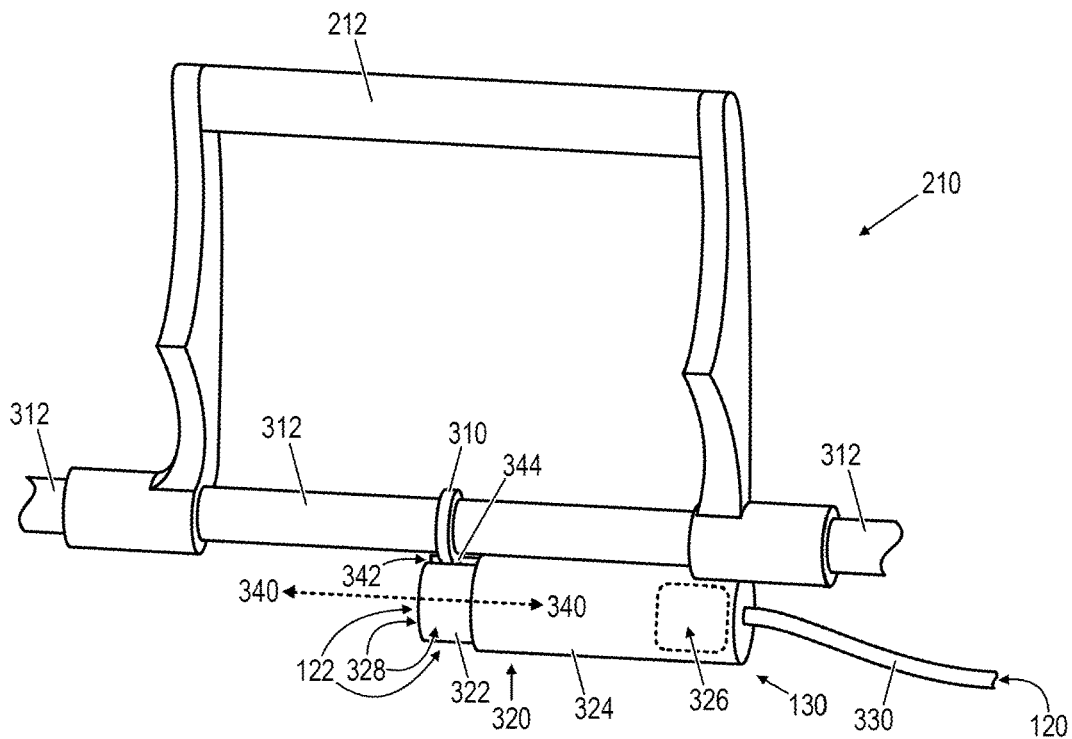
FIGS. 3A and 3B depict an example pressure differential lockout system and linkage assembly for a door of the aircraft of FIG. 1.
Figure 3B:
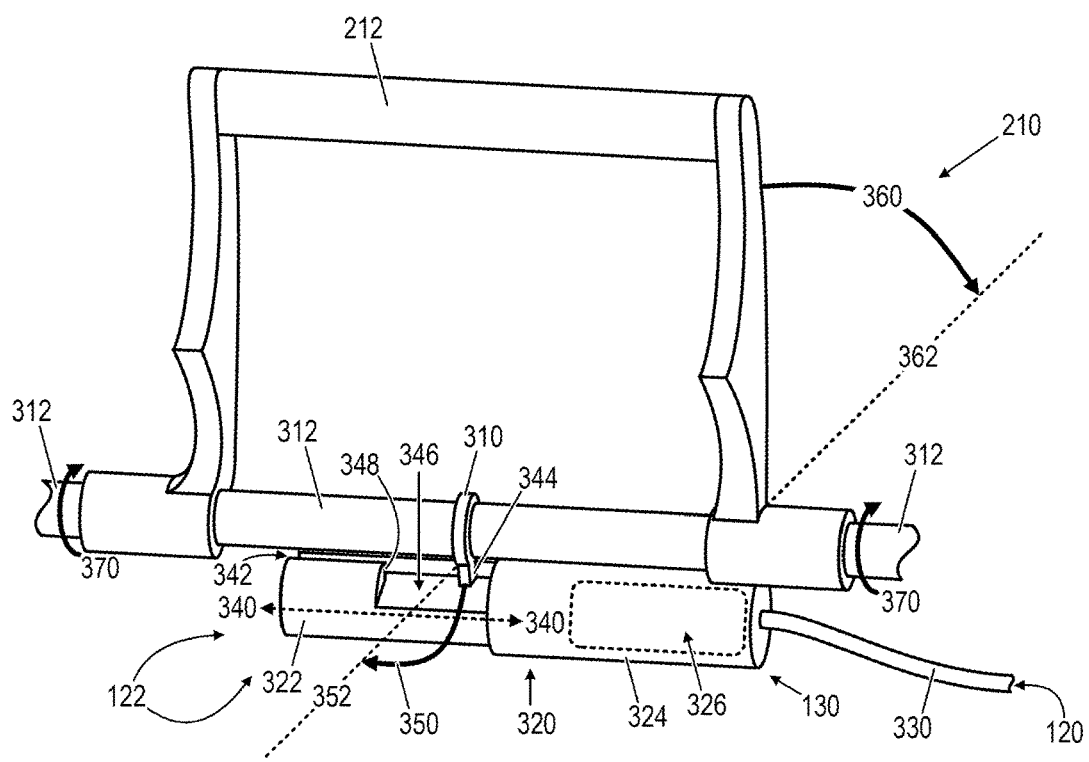

FIGS. 3A and 3B depict aspects of pressure differential lockout system 130 and linkage assembly 210 in further detail.

In FIG. 3A, pressure differential lockout system 130 inhibits latch release handle 212 from being rotated to release a door (e.g., 114 of FIGS. 1 and 2) from a closed state, thereby inhibiting the door from being opened.

System 130 comprises a follower linkage 310 mechanically coupled with latch release handle 212 of linkage assembly 210. In this example, follower linkage 310 and latch release handle 212 are mechanically coupled with each other by each being mounted to a shaft 312 at a fixed position, thereby coordinating rotation of the follower linkage and the latch release handle with each other. In another example, follower linkage 310 can be coupled to another shaft of linkage assembly 210 that is mechanically coupled with handle 212 via one or more additional components of the linkage assembly.

System 130 further comprises a piston assembly 320 including a piston 322 and a piston housing 324 collectively defining an interior chamber 326 of the piston assembly.

System 130 further comprises a fluid conduit 330 that provides fluid communication between first region 120 and interior chamber 326 of piston assembly 320. In this example, fluid conduit 330 is fluidically coupled to piston housing 324. Fluid conduit 330 can be formed from one or more sections of flexible conduit material and/or rigid conduit material. Fluid conduit 330 can be formed from one or more straight, curved, or circuitous sections.

Piston 322 is translatable along a translation axis 340 relative to piston housing 324 responsive to a pressure differential between interior chamber 326 of piston assembly 320 and second region 122 in fluid communication with an exterior side 328 of the piston from the interior chamber.

Piston 322 defines a channel 342 that is parallel to translation axis 340. Channel 342 accommodates a follower component 344 of follower linkage 310. As piston 322 translates along translation axis 340, follower component 344 translates relative to piston 322 along channel 342. Channel 342 defined by piston 322 inhibits rotation of follower linkage 310 within a first translation range of the piston along translation axis 340 (e.g., as depicted in FIG. 3A) and enables rotation of the follower linkage within a second translation range of the piston along the translation axis (e.g., as depicted in FIG. 3B).

In FIG. 3B, pressure differential lockout system 130 enables latch release handle 212 to be rotated to release the door (e.g., 114 of FIGS. 1 and 2) from the closed state, enabling the door to be opened. Within the example of FIG. 3B, a pressure differential between first region 120 and second region 122 has be reduced as compared to the example of FIG. 3A, which in turn reduces the pressure differential between interior chamber 326 and second region 122 due to fluid communication provided by fluid conduit 330 between the interior chamber and the first region. Within the context of aircraft 100 of FIG. 1, as an example, movement of the aircraft to an operating environment (e.g., lower elevation) in which a pressure of first region 120 increases to or toward a pressure of second region 122 results in a reduction in a pressure differential between interior chamber 326 and the second region.

As depicted in FIG. 3B, piston 322 further defines an opening 346 in a side wall 348 of channel 342 that accommodates rotation of follower component 344 of follower linkage 310 out of the channel along a path of rotation 350 that is orthogonal to translation axis 340. As follower component 344 is no longer constrained by channel 342 in the example of FIG. 3B, handle 212 can be rotated along a path of rotation 360 to a position 362 corresponding to disengagement of the door latches. As handle 212 is mechanically coupled with follower linkage 310 by shaft 312, rotation of handle 212 to position 362 about an axis of the shaft results in rotation of shaft 312 as indicated by arrows 370, which in turn results in rotation of follower linkage 310 about the axis of the shaft along path of rotation 350 to a position 352.

FIGS. 4A, 4B, and 4C depict additional aspects of pressure differential lockout system 130, including interior features of piston assembly 320. Within FIGS. 4A, 4B, and 4C, a wall portion of piston housing 324 has been removed to reveal features of piston 322 and internal chamber 326 of piston assembly 320.

FIG. 4A depicts pressure differential lockout system 130 in which follower component 344 of follower linkage 310 is located at a first position relative to piston 322, corresponding to FIG. 3A. In the example of FIG. 4A, follower component 344 is accommodated by channel 342 and is out of alignment with opening 346 to inhibit rotation of follower linkage 310. A floor surface of channel 342 and opening 346 are represented by a first type of crosshatching in FIGS. 4A, 4B, and 4C for purposes of illustration. Interior chamber 326 of piston assembly 320 is depicted in FIG. 4A having a first volume corresponding to a first position of piston 322 along translation axis 340. As an example, second region 122 has a greater pressure than first region 120, such as a pressure differential between the first region and the second region that exceeds a threshold at which the door is inhibited from being opened via the latch release handle.

As depicted schematically in FIG. 4A, channel 342 defined by piston 322 inhibits rotation of the follower linkage within a first translation range 480 of the piston along translation axis 340 due to follower component 344 being out of alignment with opening 346, and enables rotation of the follower linkage within a second translation range 482 of the piston along the translation axis due to alignment of follower component 344 with opening 346, as described with reference to FIGS. 4B and 4C.

Furthermore, in this example, piston 322 includes one or more annular seals 410 to inhibit or reduce fluid communication (e.g., air leakage) between internal region 326 and second region 122. Furthermore, in this example, fluid conduit 330 is fluidically coupled to a port 412 defined by a wall of piston body 324 and to a port 422 defined by a wall 414 of the door or of fuselage 110 of aircraft 100 of FIG. 1 to provide fluid communication between first region 120 and interior chamber 326. In at least some examples, fluid conduit 330 and/or port 422 can be heated by a heating element 420 to inhibit or reduce freezing of the fluid conduit and/or port. As an example, heating element 420 can take the form of an electric resistive heating coil that surrounds an exterior of fluid conduit 330 and/or port 422. In at least some examples, heating element 420 can be provided along a portion or an entire length of fluid conduit 330. For example, heating element 420 can be provided along segments of fluid conduit 330 that are exposed to temperatures that can result in freezing of water vapor within the fluid conduit, particularly in scenarios where the fluid conduit is of substantial length.

FIG. 4B depicts pressure differential lockout system 130 in which follower component 344 of following linkage 310 is located at a second position relative to piston 322, corresponding to FIG. 3B. In the example of FIG. 4B, follower component 344 of follower linkage 310 is in alignment with opening 346 and is enabled to rotate out of channel 342 through opening 346. Interior chamber 326 of piston assembly 320 is depicted in FIG. 4B having a second volume, greater than the first volume of FIG. 4A, which corresponds to a second position of piston 322 along translation axis 340. In the example of FIG. 4B, piston 322 projects outward from piston body 324 by a greater distance as compared to FIG. 4A due to a lower pressure differential between second region 122 and first region 120. As an example, first region 120 and second region 122 have equivalent pressure in the example of FIG. 4B. Alternatively, the example of FIG. 4B can correspond to a non-zero pressure differential between first region 120 and second region 122 that is less than the pressure differential of FIG. 4A.

FIG. 4C depicts pressure differential lockout system 130 in which follower component 344 has been rotated out of channel 342 through opening 346 along path of rotation 350, responsive to the latch release handle being rotated to open the door.

In at least some examples, pressure differential lockout system 130 further comprises a spring that urges piston 322 toward second translation range 482 in which follower component 344 is in alignment with opening 346. Use of a spring to urge piston 322 toward second translation range 482 can assist in returning follower component 344 into alignment with opening 346 when the pressure differential between first region 120 and second region 122 is below a threshold. Referring to FIG. 4C, as an example, a spring 490 is schematically depicted within interior chamber 326 of the piston assembly. In this example, spring 490 exerts a spring force between piston housing 324 and piston 322.

Figure 5A:
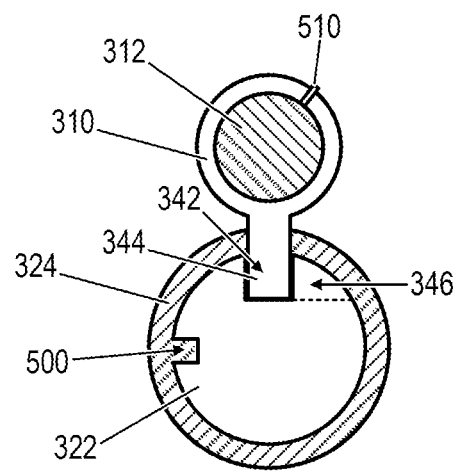
FIGS. 5A and 5B depict additional aspects of the pressure differential lockout system of FIGS. 3A and 3B.
Figure 5B:
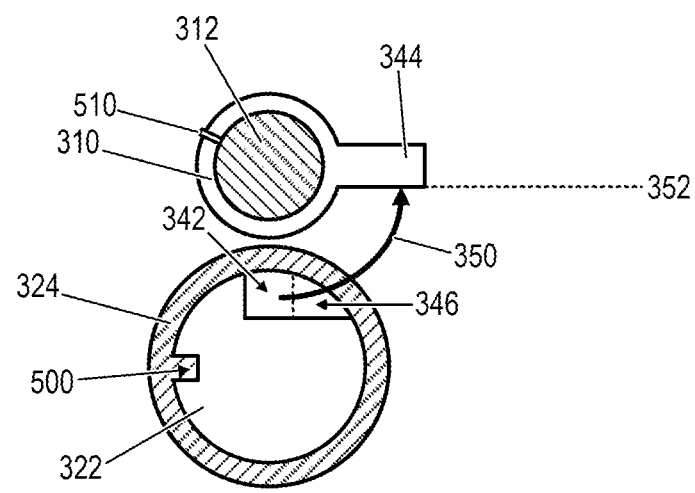

FIGS. 5A and 5B depict additional aspects of the pressure differential lockout system of FIGS. 3A and 3B as viewed along translation axis 340. In this example, piston 322 has a circular cross section and piston housing 324 defines a circular bore that accommodates the piston. It will be understood that piston 322 can have a cross section of other suitable shapes including oval or polygonal, as examples. In each of these examples, piston housing 324 has a bore that accommodates the shape of piston 322.

Furthermore, in at least some examples, piston 322 and piston housing 324 can define a keyway 500 that inhibits rotation of the piston within the bore of the piston housing. Additionally, the keyway can ensure that piston 322 and piston housing 324 are assembled correctly with the piston positioned accurately with respect to the follower linkage and other components of the linkage assembly. A keyway, such as example keyway 500 can be provided in examples in which piston 322 has a circular shape and piston housing 324 has a circular bore, but can be excluded in at least some examples where noncircular cross sections are used.

FIG. 5A depicts follower component 344 out of alignment with opening 346 of channel 342 to inhibit rotation of follower linkage 310, such as previously described with reference to FIGS. 3A and 4A.

FIG. 5B depicts follower component 344 in alignment with opening 346 of channel 342 to enable rotation of follower linkage 310 out of channel 342 along path of rotation 350 to position 352, such as previously described with reference to FIGS. 3B, 4B, and 4C.

In at least some examples, follower linkage 310 can be secured to shaft 312 via one or more threaded set screws, an example of which is depicted schematically in FIGS. 5A and 5B as set screw 510. The set screws can be loosened to enable follower linkage 310 to be repositioned at various locations along shaft 312, and retightened to secure the follower linkage to the shaft at a desired location. In another example, follower linkage 310 can include an annular clamp that applies a compressive force onto shaft 312 to secure the follower linkage to the shaft. The annular clamp can be loosed (e.g., via one or more clamp screws) to enable follower linkage 310 to be repositioned at various locations along shaft 312, and retightened (e.g., via the one or more clamp screws) to secure the follower linkage to the shaft at a desired location.

Figure 6:
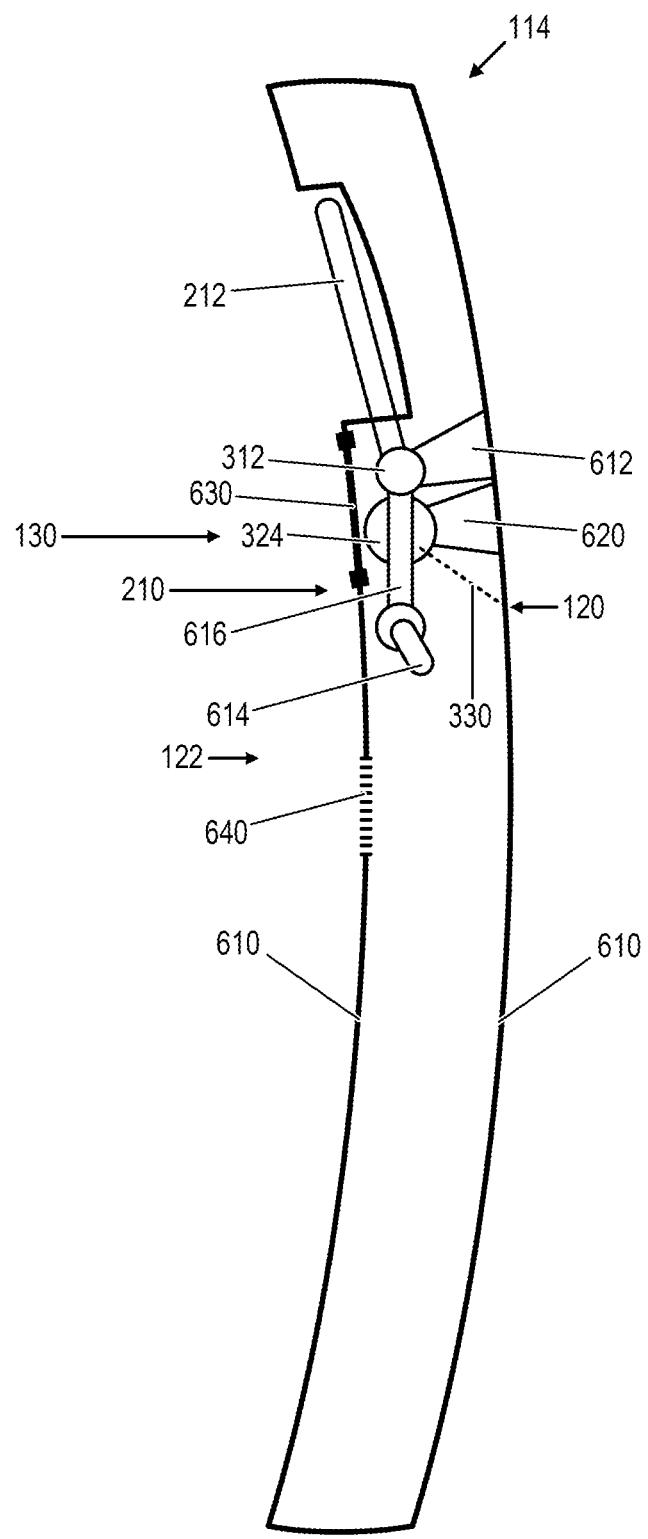
FIG. 6 schematically depicts an example door for separating a first region from a second region of different pressures.

FIG. 6 schematically depicts a section view of example of door 114 for separating first region 120 from second region 122 of different pressures. In this example, door 114 comprises a body 610, linkage assembly 210, and pressure differential lockout system 130, as previously described. While door 114 is described within the context of a door of an aircraft, such as aircraft 100 of FIG. 1, it will be understood that door 114 can be used in other contexts to separate a first region from a second region of different pressures.

In this example, linkage assembly 210 is mounted to body 610 of door 114 via a bracket 612 through which shaft 312 is rotatably mounted. Linkage assembly 210 includes latch release handle 212 and one or more door latches mechanically coupled with the latch release handle via one or more components, including shaft 312. An example door latch 614 is depicted in FIG. 6 for a first side of door 114. It will be understood that another door latch can be provided on a second side of door 114. In the example of FIG. 6, linkage assembly 210 further includes an additional linkage 616 that mechanically couples door latch 614 with shaft 312, enabling rotation of latch release handle 212 to induce movement (e.g., rotation) of latch 614. It will be understood that latch 614 can be mounted directly to shaft 312 in other examples, or additional components of linkage assembly 210 can be provided to coordinate rotation of latch release handle 212 with movement of each of the one or more latches of linkage assembly 210. Such components can include linkages, gears, shafts, etc., as examples.

Furthermore, in this example, piston housing 324 of pressure differential lockout system 130 is mounted to body 610 of door 114. As an example, piston housing 324 can be mounted to body 610 of door 114 via a bracket 620. As previously described, pressure differential lockout system 130 inhibits latch release handle 212 from being operable via follower linkage 310 to thereby inhibit operation of latches (e.g., 614) that are mechanically coupled with the latch release handle. As previously described, channel 342 defined by piston 322 of system 130 inhibits rotation of follower linkage 310 that is mechanically coupled with latch release handle 212 via shaft 312 within a first translation range (e.g., 480) of the piston along translation axis 340 and enables rotation of the follower linkage within a second translation range (e.g., 482) of the piston along the translation axis. Furthermore, in this example, fluid conduit 330, represented schematically in FIG. 6, interfaces with first region 120 at an exterior side of door 114. In other examples, fluid conduit 330 can traverse a hinge of the door to interface with first region 120 at an exterior side of a fuselage or other wall that separates the first and second regions.

In at least some examples, door 114 can include an access panel 630 that enables technicians to access components of pressure differential lockout system 130, such as during calibration or maintenance of the pressure lockout system as described in further detail with reference to FIG. 7. In other examples, access panel 630 can be omitted, and components of pressure differential lockout system 130 can be accessed by removing door linings or other components of the door.

In at least some examples, door 114 can include a vent 640 that provides fluid communication of second region 122 with piston 322 of pressure differential lockout system 130. It will be understood that vent 640 can be omitted in some configurations, including configurations in which a fluid conduit provides fluid communication between the second region and piston, for example, as described in further detail with reference to FIG. 8.

FIG. 7 is a flow diagram depicting an example method 700 of calibrating a pressure differential lockout system for a door separating a first region from a second region. As an example, pressure differential lockout system 130 can be calibrated by performing method 700. Within the context of aircraft 100 of FIG. 1, as an example, the first region can correspond to an environment outside of the fuselage of the aircraft (e.g., first region 120), and the second region can correspond to an interior of the fuselage (e.g., second region 122).

Calibration of the pressure differential lockout system by method 700 can be performed to account for variations in pressure differential introduced by the fluid conduit of the pressure differential lockout system, which can vary due to length and/or configuration of the fluid conduit being utilized. For example, some installations may permit longer or shorter fluid conduits and/or fluid conduits of different cross sections and/or routing (e.g., linear vs. circuitous). Additionally or alternatively, calibration of the pressure differential lockout system by method 700 can be performed to account for friction variations within the system and/or variations in target pressure differentials at which the pressure differential lockout system inhibits or enables the door to be opened via the latch release handle. For example, variations in a length of the fluid conduit can result in variation in operation of the pressure differential lockout system that can be accommodated through calibration. As another example, some applications can be calibrated to permit the door to be opened at a pressure differential between the first region and the second region that is below a target threshold, but greater than zero pressure differential.

At 710, the method comprises installing the pressure differential lockout system for the door separating the first region from the second region. In at least some examples, installing the pressure differential lockout system at 710 includes one or more operations, such as described with reference to operations 712, 714, and 716.

At 712, the method comprises mounting a piston housing of a piston assembly of the pressure differential lockout system to a body of the door. As described with reference to example piston assembly 320, piston housing 324 and piston 322 of the piston assembly collectively define an interior chamber 326 of the piston assembly. As described with reference to FIG. 6, piston housing 324 can mounted to the body of the door, such as within an exterior shell of the door that is in fluid communication with the second region.

At 714, the method comprises mounting a follower linkage of the pressure differential lockout system to a shaft that mechanically couples the follower linkage with a latch release handle of a linkage assembly of the door. As described with reference to example pressure differential lockout system 130, follower linkage 310 can be mounted to shaft 312 that mechanically couples the follower linkage to latch release handle 212 of linkage assembly 210 such that rotation of the latch release handle causes rotation of follower linkage 310 via the mechanical coupling provided by the shaft.

At 716, the method comprises installing a fluid conduit of the pressure lockout system that provides fluid communication between the internal region of the piston assembly and the first region. As described with reference to example pressure differential lockout system 130, fluid conduit 330 can be fluidically coupled to port 412 defined by a wall of piston body 324 and to a port 422 defined by a wall 414 (e.g., of fuselage 110 of aircraft 100) to provide fluid communication between first region 120 and interior chamber 326 of piston assembly 320.

Upon installation performed at operation 710, as described with reference to example pressure differential lockout system 130, the piston housing and the piston of the piston assembly collectively define the interior chamber of the piston assembly; the fluid conduit of the pressure differential lockout system provides fluid communication between the first region and the interior chamber of the piston assembly; the piston is translatable along a translation axis relative to the piston housing responsive to a pressure differential between the interior chamber of the piston assembly and the second region in fluid communication with an exterior side of the piston from the interior chamber; the piston defines a channel that is parallel to the translation axis and that accommodates a follower component of the follower linkage; and the piston further defines an opening in a side wall of the channel that accommodates rotation of the follower component of the follower linkage out of the channel along a path of rotation that is orthogonal to the translation axis. In this configuration, the channel defined by the piston inhibits rotation of the follower linkage within a first translation range of the piston along the translation axis and enables rotation of the follower linkage within a second translation range of the piston along the translation axis, such as previously described with reference to FIGS. 3A and 3B.

At 718, the method comprises varying a position at which the follower linkage is mounted to the shaft to locate the follower component at a suitable location for operation.

Varying the position of the follower linkage at operation 718 can include moving the follower linkage along the shaft to locate the follower component in alignment with the opening in the side wall of the channel, at operation 720, during a first condition in which the first region and the second region have equivalent pressure to enable rotation of the follower linkage out of the channel along the path of rotation (e.g., as shown in FIGS. 3B and 4B). While an example of the first condition is provided in which the first region and the second region have equivalent pressure, it will be understood that for applications in which the door is enabled to be opened at a non-zero pressure differential of less than a threshold, the first condition can instead correspond to a non-zero target pressure differential between the first region and the second region that is at or below the threshold.

Additionally or alternatively, varying the position of the follower linkage at operation 718 can include moving the follower linkage along the shaft to locate the follower component out of alignment with the opening in the side wall of the channel, at operation 722, during a second condition in which the second region has a different pressure than the first region to inhibit rotation of the follower linkage (e.g., as shown in FIGS. 3A and 4A).

As part of operation 720, the method at 724 comprises establishing the first condition in which the first region and the second region have equivalent pressure or some other non-zero target pressure differential at which the door is enabled to be opened. Within the context of aircraft 100 of FIG. 1, as an example, the first condition can be established when the aircraft is grounded and the pressure within the fuselage has been equalized with the surrounding environment outside of the fuselage. Where a non-zero target pressure differential is used, the first region or the second region can be pressurized or depressurized to achieve the non-zero target pressure differential.

As part of operation 722, the method at 726 comprises establishing the second condition in which the second region has a different pressure (e.g., a higher pressure) than the first region. Within the context of aircraft 100 of FIG. 1, as an example, the second condition can be established when the interior of the fuselage is pressurized during a test flight of the aircraft at an altitude having lower pressure than the interior of the fuselage. As another example, the second condition can be established by applying a vacuum to the port at which the fluid conduit interfaces with the first region to simulate a pressure differential that occurs during operation of the aircraft. As yet another example, the interior of the fuselage of the aircraft can be pressurized to above the pressure of the environment outside of the fuselage to simulate a pressure differential that occurs during operation of the aircraft.

It will be understood that for applications where the first condition corresponds to a non-zero target pressure differential, the second condition corresponds to a pressure differential that is greater than the non-zero target pressure differential at which the door is inhibited from being opened.

Operations 718, 720, 722, 724, and 726 can be iteratively performed over two or more cycles of the first condition, and two or more cycles of the second condition to ensure that the follower component is in alignment with the opening in the side wall of the channel during the first condition and that the follower component is out of alignment with the opening in the side wall of the channel during the second condition. At each iteration, the location at which the follower linkage is mounted to the shaft can be adjusted to converge on a location at which the follower component is in alignment with the opening in the side wall of the channel during the first condition and that the follower component is out of alignment with the opening in the side wall of the channel during the second condition.

Figure 8:
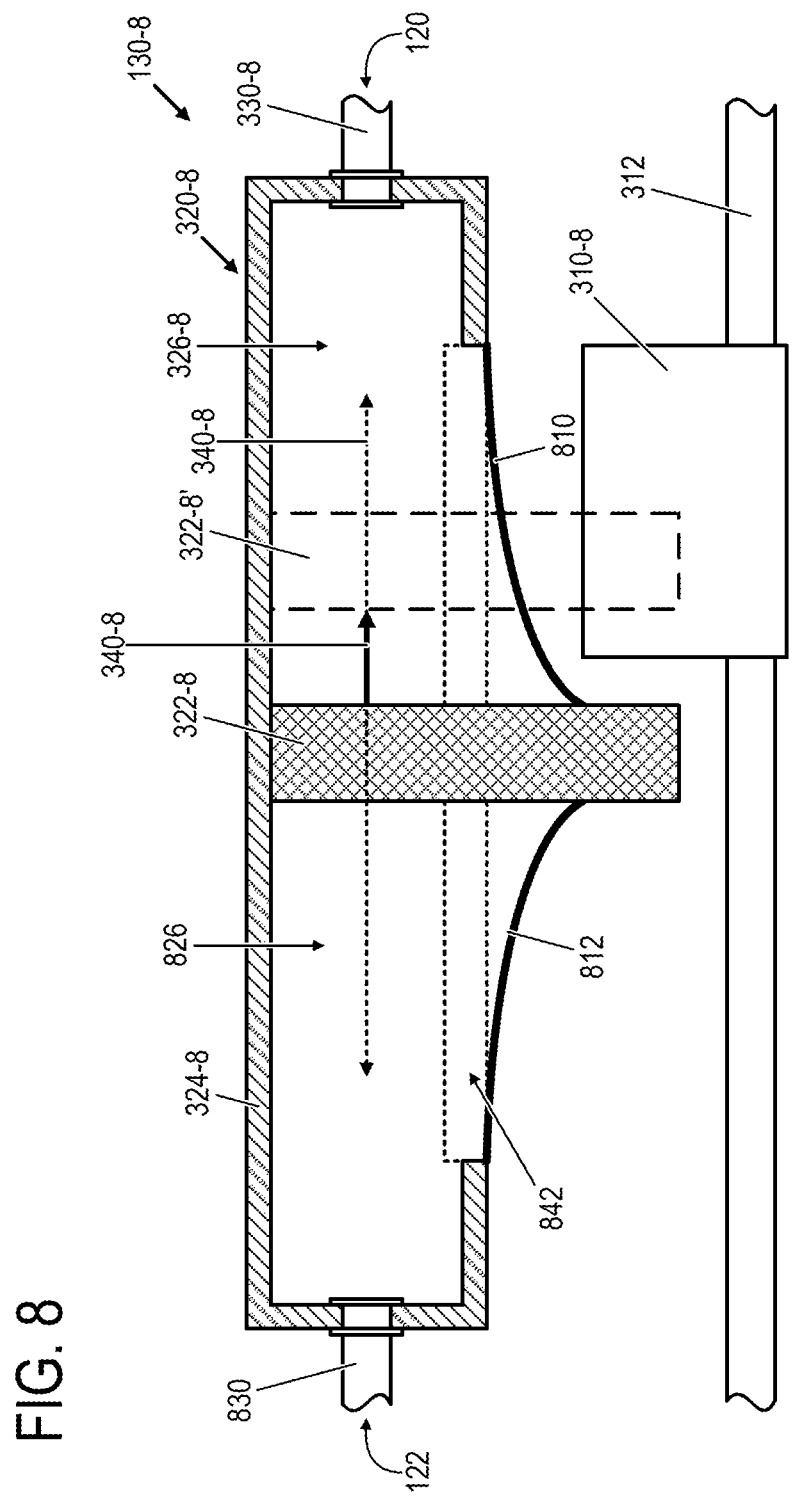
FIG. 8 depicts another example pressure differential lockout system.

In the preceding examples describe with reference to pressure differential lockout system 130, channel 342 defined by the piston 322 inhibits rotation of follower linkage 310 (and hence latch release handle 212 coupled to shaft 312) within a first translation range of the piston along the translation axis, and enables rotation of the follower linkage (and hence latch release handle 212 coupled to shaft 312) within a second translation range of the piston along the translation axis. FIG. 8 schematically depicts another example of a pressure differential lockout system 130-8 for a door separating first region 120 from second region 122. System 130-8 inhibits rotation of a follower linkage 310-8 (and hence latch release handle 212 coupled to shaft 312) within a first translation range of a piston 322-8 along a translation axis 340-8, and enables rotation of the follower linkage (and hence latch release handle 212 coupled to shaft 312) within a second translation range of the piston along the translation axis. Pressure differential lockout system 130-8 can replace pressure differential lockout system 130-8 in any of the preceding examples, including within aircraft 100 of FIG. 1, the door-integrated configuration of FIG. 6, and the calibration method of FIG. 7.

Referring to FIG. 8, pressure differential lockout system 130-8 comprises follower linkage 310-8 mechanically coupled with latch release handle 312 of linkage assembly 210 of a door (e.g., as shown in FIG. 3A).

System 130-8 further comprises a piston assembly 320-8 including piston 322-8 and a piston housing 324-8 collectively defining a first interior chamber 326-8 of the piston assembly. In this example, first interior chamber 326-8 is further defined by a first flexible seal 810 of system 130-8. Piston 322-8 and piston housing 324-8 collectively define a second interior chamber 826 of the piston assembly that is located on an opposite side of the piston from the first interior chamber 326-8. In this example, second interior chamber 826 is further defined by a second flexible seal 812 of system 130-8.

System 130-8 further comprises a first fluid conduit 330-8 that provides fluid communication between first region 120 and first interior chamber 326-8 of piston assembly 320-8. System 130-8 further comprises a second fluid conduit 830 that provides fluid communication between second region 122 and second interior chamber 826 of piston assembly 320-8. As previously described with reference to fluid conduit 330, first fluid conduit 330-8 and second fluid conduit 830 can each be formed from one or more sections of flexible conduit material and/or rigid conduit material, and can each be formed from one or more straight, curved, or circuitous sections of any suitable length.

The configuration of system 130-8 enables piston housing 324-8 to be positioned at various locations, including locations residing outside of the body of the door, as well as locations that are not in fluid communication with second region 122.

Piston 322-8 is translatable along translation axis 340-8 relative to piston housing 324-8 responsive to a pressure differential between first interior chamber 326-8 of the piston assembly and second region 122 that is in fluid communication, via second fluid conduit 830, with an exterior or opposite side of the piston (that interfaces with second interior chamber 826) from the first interior chamber. Furthermore, in this example, piston housing 324-8 defines a channel 842 that constrains movement of piston 322-8 along translation axis 340-8, such as previously described with reference to keyway 500 of FIG. 5.

FIG. 8 schematically depicts piston 322-8 at a first location along translation axis 340-8 that does not inhibit rotation of follower linkage 310-8. FIG. 8 further depicts piston 322-8 at a second location represented by broken lines and identified by reference numeral 322-8' following translation of piston 322-8 along translation axis 340-8. In this example, such translation is responsive to a pressure of second region 122 exceeding a pressure of first region 120. At the location indicated at 322-8', piston 322-8 inhibits rotation of follower linkage 310-8, thereby inhibiting rotation of the latch release handle mechanically coupled with the follower linkage via shaft 312. Translation of piston 322-8 along translation axis 340-8 results in the opposite direction responsive to a pressure of first region 120 exceeding a pressure of second region 122. Alternatively or additionally, a spring (e.g., 490 of FIG. 4C) can be included that urges piston 322-8 out of alignment with follower linkage 310-8 when the pressures of first region 120 and second region 122 are the same or below a non-zero target pressure differential.

As previously described with reference to calibration of system 130 according to method 700 of FIG. 7, system 130-8 can be calibrated at operations 720 and 722 by locating with follower component 310-8 out of alignment with piston 322-8 at operation 720, and by locating follower component 310-8 in alignment with piston 322-8 at operation 722. Additionally, for system 130-8, operation 716 of method 700 instead includes connecting first fluid conduit 330-8 to provide fluid communication between first internal region 326-8 and first region 120, and connecting second fluid conduit 380 to provide fluid communication between second internal region 826 and second region 122.

Further, the disclosure comprises configurations according to the following clauses.

Clause 1. A pressure differential lockout system for a door separating a first region from a second region, the system comprising: a follower linkage mechanically coupled with a latch release handle of a linkage assembly of the door; a piston assembly including a piston and a piston housing collectively defining an interior chamber of the piston assembly; and a fluid conduit that provides fluid communication between the first region and the interior chamber of the piston assembly; wherein the piston is translatable along a translation axis relative to the piston housing responsive to a pressure differential between the interior chamber of the piston assembly and the second region in fluid communication with an exterior side of the piston from the interior chamber; wherein the piston defines a channel that is parallel to the translation axis and that accommodates a follower component of the follower linkage; wherein the channel defined by the piston inhibits rotation of the follower linkage within a first translation range of the piston along the translation axis and enables rotation of the follower linkage within a second translation range of the piston along the translation axis.

Clause 2. The system of clause 1, wherein the first translation range of the piston corresponds to a higher pressure differential between the first region and the second region, and the second translation range of the piston corresponds to a lower pressure differential between the first region and the second region.

Clause 3. The system of any of clauses 1-2, wherein the first translation range of the piston corresponds to the second region having a higher pressure than the first region.

Clause 4. The system of any of clauses 1-3, wherein the first translation range of the piston corresponds to a lower volume of the interior chamber of the piston assembly, and the second translation range of piston corresponds to a higher volume of the interior chamber of the piston assembly.

Clause 5. The system of any of clauses 1-4, wherein the piston further defines an opening in a side wall of the channel that accommodates rotation of the follower component of the follower linkage out of the channel along a path of rotation that is orthogonal to the translation axis.

Clause 6. The system of clause 5, wherein alignment of the follower component with the opening in the side wall of the channel corresponds to the second translation range of the piston.

Clause 7. The system of any of clauses 1-6, wherein the piston housing is mounted to a body of the door in fluid communication with the second region.

Clause 8. The system of any of clauses 1-7, wherein an end of the fluid conduit is fluidically coupled to the piston housing.

Clause 9. The system of clause 8, wherein another end of the fluid conduit interfaces with the first region via a port formed in a body of the door.

Clause 10. The system of any of clauses 1-9, further comprising a heating element disposed at an end of the fluid conduit that interfaces with the first region.

Clause 11. The system of any of clauses 1-10, further comprising a spring that urges the piston toward the second translation range from the first translation range along the translation axis.

Clause 12. A door for separating a first region from a second region of different pressures, the door comprising: a body of the door; a linkage assembly mounted to the body of the door, the linkage assembly including a latch release handle and one or more door latches mechanically coupled with the latch release handle; a pressure differential lockout system, comprising: a follower linkage mechanically coupled with the latch release handle of the linkage assembly; a piston assembly including a piston and a piston housing collectively defining an interior chamber of the piston assembly; and a fluid conduit that provides fluid communication between the first region and the interior chamber of the piston assembly; wherein the piston housing is mounted to the body of the door in fluid communication with the second region; wherein the piston is translatable along a translation axis relative to the piston housing responsive to a pressure differential between the interior chamber of the piston assembly and the second region in fluid communication with an exterior side of the piston from the interior chamber; wherein the piston defines a channel that is parallel to the translation axis and that accommodates a follower component of the follower linkage; wherein the channel defined by the piston inhibits rotation of the follower linkage within a first translation range of the piston along the translation axis and enables rotation of the follower linkage within a second translation range of the piston along the translation axis.

Clause 13. The door of clause 12, wherein the first translation range of the piston corresponds to a higher pressure differential between the first region and the second region, and the second translation range of the piston corresponds to a lower pressure differential between the first region and the second region.

Clause 14. The door of any of clauses 12-13, wherein the first translation range of the piston corresponds to the second region having a higher pressure than the first region.

Clause 15. The door of any of clauses 12-14, wherein the first translation range of the piston corresponds to a lower volume of the interior chamber of the piston assembly, and the second translation range of piston corresponds to a higher volume of the interior chamber of the piston assembly.

Clause 16. The door of any of clauses 12-15, wherein the piston further defines an opening in a side wall of the channel that accommodates rotation of the follower component of the follower linkage out of the channel along a path of rotation that is orthogonal to the translation axis; and wherein alignment of the follower component with the opening in the side wall of the channel corresponds to the second translation range of the piston.

Clause 17. The door of any of clauses 12-16, further comprising a heating element disposed at an end of the fluid conduit that interfaces with the first region.

Clause 18. The door of any of clauses 12-17, further comprising a spring that urges the piston toward the second translation range from the first translation range along the translation axis.

Clause 19. A method of calibrating a pressure differential lockout system for a door separating a first region from a second region, the method comprising: mounting a piston housing of a piston assembly of the pressure differential lockout system to a body of the door; wherein the piston housing and a piston of the piston assembly collectively define an interior chamber of the piston assembly; wherein a fluid conduit of the pressure differential lockout system provides fluid communication between the first region and the interior chamber of the piston assembly; wherein the piston is translatable along a translation axis relative to the piston housing responsive to a pressure differential between the interior chamber of the piston assembly and the second region in fluid communication with an exterior side of the piston from the interior chamber; mounting a follower linkage of the pressure differential lockout system to a shaft of a linkage assembly that mechanically couples the follower linkage with a latch release handle of the door; wherein the piston defines a channel that is parallel to the translation axis and that accommodates a follower component of the follower linkage; wherein the piston further defines an opening in a side wall of the channel that accommodates rotation of the follower component of the follower linkage out of the channel along a path of rotation that is orthogonal to the translation axis; and varying a position at which the follower linkage is mounted to the shaft to locate the follower component: in alignment with the opening in the side wall of the channel during a first condition in which the first region and the second region have equivalent pressure to enable rotation of the follower linkage out of the channel along the path of rotation, and out of alignment with the opening in the side wall of the channel during a second condition in which the second region has a different pressure than the first region to inhibit rotation of the follower linkage.

Clause 20. The method of clause 19, wherein the second region has a higher pressure than the first region during the second condition.

It will be understood that the configurations and/or approaches described herein are exemplary in nature, and that specific examples are not to be considered in a limiting sense, because numerous variations are possible. The specific methods or operations described herein may represent one or more of any number of techniques. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various methods, operations, systems, and configurations, and other features, functions, acts, and/or properties disclosed herein, as well as any and all equivalents thereof.

The invention claimed is:

1. A pressure differential lockout system for a door separating a first region from a second region, the system comprising:
   a follower linkage mechanically coupled with a latch release handle of a linkage assembly of the door;
   a piston assembly including a piston and a piston housing collectively defining an interior chamber of the piston assembly; and
   a fluid conduit that provides fluid communication between the first region and the interior chamber of the piston assembly;
   wherein the piston is translatable along a translation axis relative to the piston housing responsive to a pressure differential between the interior chamber of the piston assembly and the second region in fluid communication with an exterior side of the piston from the interior chamber;

wherein the piston defines a channel that is parallel to the translation axis and that accommodates a follower component of the follower linkage;

wherein the channel defined by the piston inhibits rotation of the follower linkage within a first translation range of the piston along the translation axis and enables rotation of the follower linkage within a second translation range of the piston along the translation axis.

2. The system of claim 1, wherein the first translation range of the piston corresponds to a higher pressure differential between the first region and the second region, and the second translation range of the piston corresponds to a lower pressure differential between the first region and the second region.

3. The system of claim 1, wherein the first translation range of the piston corresponds to the second region having a higher pressure than the first region.

4. The system of claim 1, wherein the first translation range of the piston corresponds to a lower volume of the interior chamber of the piston assembly, and the second translation range of piston corresponds to a higher volume of the interior chamber of the piston assembly.

5. The system of claim 1, wherein the piston further defines an opening in a side wall of the channel that accommodates rotation of the follower component of the follower linkage out of the channel along a path of rotation that is orthogonal to the translation axis.

6. The system of claim 5, wherein alignment of the follower component with the opening in the side wall of the channel corresponds to the second translation range of the piston.

7. The system of claim 1, wherein the piston housing is mounted to a body of the door in fluid communication with the second region.

8. The system of claim 1, wherein an end of the fluid conduit is fluidically coupled to the piston housing.

9. The system of claim 8, wherein another end of the fluid conduit interfaces with the first region via a port formed in a body of the door.

10. The system of claim 1, further comprising a heating element disposed at an end of the fluid conduit that interfaces with the first region.

11. The system of claim 1, further comprising a spring that urges the piston toward the second translation range from the first translation range along the translation axis.

12. A door for separating a first region from a second region of different pressures, the door comprising:
a body of the door;
a linkage assembly mounted to the body of the door, the linkage assembly including a latch release handle and one or more door latches mechanically coupled with the latch release handle;
a pressure differential lockout system, comprising:
a follower linkage mechanically coupled with the latch release handle of the linkage assembly;
a piston assembly including a piston and a piston housing collectively defining an interior chamber of the piston assembly; and
a fluid conduit that provides fluid communication between the first region and the interior chamber of the piston assembly;
wherein the piston housing is mounted to the body of the door in fluid communication with the second region;

wherein the piston is translatable along a translation axis relative to the piston housing responsive to a pressure differential between the interior chamber of the piston assembly and the second region in fluid communication with an exterior side of the piston from the interior chamber;

wherein the piston defines a channel that is parallel to the translation axis and that accommodates a follower component of the follower linkage;

wherein the channel defined by the piston inhibits rotation of the follower linkage within a first translation range of the piston along the translation axis and enables rotation of the follower linkage within a second translation range of the piston along the translation axis.

13. The door of claim 12, wherein the first translation range of the piston corresponds to a higher pressure differential between the first region and the second region, and the second translation range of the piston corresponds to a lower pressure differential between the first region and the second region.

14. The door of claim 12, wherein the first translation range of the piston corresponds to the second region having a higher pressure than the first region.

15. The door of claim 12, wherein the first translation range of the piston corresponds to a lower volume of the interior chamber of the piston assembly, and the second translation range of piston corresponds to a higher volume of the interior chamber of the piston assembly.

16. The door of claim 12, wherein the piston further defines an opening in a side wall of the channel that accommodates rotation of the follower component of the follower linkage out of the channel along a path of rotation that is orthogonal to the translation axis; and
wherein alignment of the follower component with the opening in the side wall of the channel corresponds to the second translation range of the piston.

17. The door of claim 12, further comprising a heating element disposed at an end of the fluid conduit that interfaces with the first region.

18. The door of claim 12, further comprising a spring that urges the piston toward the second translation range from the first translation range along the translation axis.

19. A method of calibrating a pressure differential lockout system for a door separating a first region from a second region, the method comprising:
mounting a piston housing of a piston assembly of the pressure differential lockout system to a body of the door;
wherein the piston housing and a piston of the piston assembly collectively define an interior chamber of the piston assembly;
wherein a fluid conduit of the pressure differential lockout system provides fluid communication between the first region and the interior chamber of the piston assembly;
wherein the piston is translatable along a translation axis relative to the piston housing responsive to a pressure differential between the interior chamber of the piston assembly and the second region in fluid communication with an exterior side of the piston from the interior chamber;
mounting a follower linkage of the pressure differential lockout system to a shaft of a linkage assembly that mechanically couples the follower linkage with a latch release handle of the door;

wherein the piston defines a channel that is parallel to the translation axis and that accommodates a follower component of the follower linkage;

wherein the piston further defines an opening in a side wall of the channel that accommodates rotation of the follower component of the follower linkage out of the channel along a path of rotation that is orthogonal to the translation axis; and varying a position at which the follower linkage is mounted to the shaft to locate the follower component:

in alignment with the opening in the side wall of the channel during a first condition in which the first region and the second region have equivalent pressure to enable rotation of the follower linkage out of the channel along the path of rotation, and out of alignment with the opening in the side wall of the channel during a second condition in which the second region has a different pressure than the first region to inhibit rotation of the follower linkage.

20. The method of claim 19, wherein the second region has a higher pressure than the first region during the second condition.

\* \* \* \* \*